(12) United States Patent
Pirklbauer (10) Patent No.: US 11,691,739 B2
(45) Date of Patent: Jul. 4, 2023

(54) VEHICLE SEAT WITH NET-LIKE STRUCTURE IN A SEAT SHELL

(71) Applicant: Airbus Operations GmbH, Hamburg (DE)

(72) Inventor: Peter Leopold Pirklbauer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/538,263

(22) Filed: Nov. 30, 2021

(65) Prior Publication Data

US 2022/0177140 A1 Jun. 9, 2022

Related U.S. Application Data

(63) Continuation of application No. PCT/EP2020/081536, filed on Nov. 9, 2020.

(30) Foreign Application Priority Data

Nov. 29, 2019 (DE) ...................... 10 2019 132 557.9

(51) Int. Cl.
*B64D 11/06* (2006.01)
(52) U.S. Cl.
CPC ................. *B64D 11/0647* (2014.12)
(58) Field of Classification Search
CPC ..................... B64D 11/0647; B60N 2/7011
USPC .................................................... 297/452.56
See application file for complete search history.

(56) References Cited

U.S. PATENT DOCUMENTS

| 6,739,671 B2 * | 5/2004 | De Maina | B60N 2/7029 |
| | | | 297/440.22 |
| 6,824,213 B2 * | 11/2004 | Skelly | B64D 11/06 |
| | | | 297/217.3 |
| 9,056,570 B2 * | 6/2015 | Laib | B60N 2/565 |
| 9,126,519 B2 | 9/2015 | Uebelacker | |
| 9,630,717 B2 * | 4/2017 | Wilkens | B64D 11/00151 |
| 2002/0089219 A1 | 7/2002 | Blanco et al. | |
| 2008/0290715 A1 | 11/2008 | Fullerton et al. | |
| 2014/0015290 A1 | 1/2014 | Saada et al. | |
| 2014/0239677 A1 | 8/2014 | Laib et al. | |

FOREIGN PATENT DOCUMENTS

| DE | 10 2010 018822 A1 | 11/2011 |
| DE | 10 2011 055 286 A1 | 4/2013 |
| EP | 1177935 A2 | 2/2002 |

(Continued)

OTHER PUBLICATIONS

German Search Report for Application No. 102019132557 dated Sep. 15, 2020.

(Continued)

*Primary Examiner* — Mark R Wendell
(74) *Attorney, Agent, or Firm* — KDW Firm PLLC (57) ABSTRACT

A vehicle seat having at least one seat shell, the seat shell having a frame with two spaced-apart frame units and a shell surface arrangement extending from one of the frame units to the other frame unit. The shell surface arrangement has a net-like structure having a first fiber-reinforced plastic, and the seat shell has at least one holding element connected to a corresponding receiving element for fastening the seat shell.

13 Claims, 5 Drawing Sheets

(56) References Cited

FOREIGN PATENT DOCUMENTS

WO  WO 2015/045143 A1  4/2015
WO  WO 2016/128524 A1  8/2016

OTHER PUBLICATIONS

International Search Report for Application No. PCT/EP2020/081536 dated Jan. 22, 2021.
European Office Action for Application 20803836 dated Mar. 3, 2023.

* cited by examiner

VEHICLE SEAT WITH NET-LIKE STRUCTURE IN A SEAT SHELL

CROSS-REFERENCE TO RELATED APPLICATIONS

This application is a continuation of and claims priority to Patent Application No. PCT/EP2020/081536 filed Nov. 9, 2020, which claims priority to German Patent Application No. 10 2019 132 557.9 filed Nov. 29, 2019, the entire disclosures of which are incorporated by reference herein.

TECHNICAL FIELD

The disclosure herein relates to a vehicle seat and to an aircraft having at least one cabin and at least one vehicle seat arranged therein.

BACKGROUND

Vehicle seats are used to accommodate seated passengers in a vehicle. The construction of a vehicle seat depends on a load scenario for which the vehicle seat is to receive corresponding certification. The load scenarios differ, depending on the type of vehicle. In the case of aircraft seats, approximately maximum static and dynamic operating loads which can act on a passenger and the seat without impairing the function of the seat are assumed.

Aircraft seats usually have a stand with a front seat leg and a rear seat foot, between which diagonal struts extend. A tubular cross strut extends horizontally on the stand and can receive one or more seat surfaces. A backrest is usually arranged pivotably on the stand. Owing to the high number of passenger seats in an aircraft cabin, the aircraft seats are produced from lightweight and strong materials, minimizing a resulting total weight of the seat. The concept of such aircraft seats has existed for decades and, to a large extent, has only been improved in partial aspects.

SUMMARY

It is an object of the subject matter herein to disclose an alternative vehicle seat which is further improved in terms of weight and can nevertheless be fastened to already existing fastening elements in a passenger cabin of the vehicle in question.

The object is achieved by a vehicle seat disclosed herein. Advantageous embodiments and developments are disclosed herein.

A vehicle seat is proposed having at least one seat shell, wherein the seat shell has a frame with two spaced-apart frame units and a shell surface arrangement extending from one of the frame units to the other frame unit, wherein the shell surface arrangement has a net-like structure consisting of or comprising a first fiber-reinforced plastic, and wherein the seat shell has at least one holding element, which is connected to a corresponding receiving element for fastening the seat shell.

An essential component of the vehicle seat is the seat shell, which provides the seat function. The seat shell can be fitted in the vehicle in question in various ways. In addition to a stand provided specifically for the seat shell, it would also be conceivable to arrange the seat shell directly in the vehicle, for example on a suitable shoulder or a suitable surface.

The seat shell has a frame, which is supplemented by the net-like structure to form a complete seat shell. A net-like structure should be understood to mean a structure which has a multiplicity of linear or strip-shaped fiber sections which intersect at nodes. Consequently, a region lying between the frame units is not filled by a continuous, sheet-like structure but has open meshes delimited by fiber sections. Since the net-like structure consists of or comprises the first fiber-reinforced plastic, it is dimensionally stable.

The net-like structure could be used for covering with textiles. Furthermore, it can also be used as an inner structure for components enclosed in foam, the outer shell of which originates, for example, from an injection molding process.

A free geometric design is a particular advantage here for the sake of obtaining an optimum lightweight construction in which a fiber roving of desired thickness and length is impregnated with resin and laid over a deposition device.

The first fiber-reinforced plastic can have a matrix consisting of or comprising a plastic material with reinforcing fibers embedded therein. In this case, the plastic may comprise a thermosetting resin or a thermoplastic material. In particular, the reinforcing fibers could be embodied as carbon fibers. Alternatively, glass fibers, aramid fibers or other high-tensile reinforcing fibers as well as natural fibers such as protein-based spider silk or rayon would also be conceivable. The term "first" is only intended to distinguish the material used in the net-like structure from another material, which will be described below.

The frame units form an interface between a fastening surface, a stand or some other base and the net-like structure. They can be embodied, for example, as lateral frame units which extend laterally along the seat surface and the backrest. The frame units could have suitable fastening elements which can receive the net-like structure. These could be metal bushes, for instance. In a simple case, the net-like structure can also be laminated onto the frame units. In this case, the fastening elements are formed by the material connection between the net-like structure and the frame units.

The vehicle shell may also be composed of several materials, which, in addition to the first fiber-reinforced plastic, may also comprise other fiber-reinforced plastics. Furthermore, the use of metal components, such as bushes or fastening elements, is conceivable. For reasons of weight, it is advisable to use an aluminum alloy or titanium. Alternatively, it is also possible to use a steel, in particular a stainless steel. The frame units can also consist of or comprise several materials, for example a fiber-reinforced plastic and metal components integrated therein or arranged thereon.

In a simple case, the receiving elements can be embodied as bores, openings, holders or cutouts. In the following, mention is made of separate bodies which can be used. These could consist of or comprise, for example, a metallic material, which can be designed as described above.

The particular advantage of this construction is that the net-like structure is adapted to force profiles that are to be expected in the interior of the seat shell by a skillfully chosen fiber path. For ergonomic reasons, the seat shell can have a spatially curved shape which is adopted by the frame units and the net-like structure. When the seat shell is subjected to a load imposed by a person seated on it, force profiles in the interior of the seat shell which depend on the shape and the load can occur. The net-like structure provides a multiplicity of separate load paths. Material is selectively omitted between the individual load paths. By adapting the fiber sections, that is to say their width and their distribution over the seat shell, optimum adaptation to the force profiles to be expected can be accomplished, thus ensuring that fiber sections in the net-like structure are subjected to loads in an optimum manner. In this case, the load is characterized particularly by tensile forces, which can be absorbed in an optimum manner by the fiber sections. The three-dimensional fiber strand design is optimized. By the net-like structure, an adequate strength of the seat shell can be achieved, while the weight is significantly reduced as compared with a conventional, sheet-like seat shell by residual gaps between the individual fiber sections.

In an advantageous embodiment, the net-like structure has a multiplicity of linear or strip-shaped, intersecting fiber sections. In particular, the linear or other type of fiber sections can be designed as connected fiber strands. The fibers could be provided in one layer or in a small number of layers, for example. The layers could extend over a width of a few millimeters to a few centimeters. The fiber sections could have a rectangular cross section whose width is significantly greater than its height. However, the individual fiber sections could also have a round, for example circular or oval, cross section or a cross section rounded in some other way. The production of the net-like structure could be achieved by the use of dry fibers which are attached to the frame units so as to be distributed between the frame units in the desired manner. Impregnation with resin and curing can then take place. The curing of the resin can be carried out, for example, in a vacuum bag by the tempering process or by UV light in an exothermic process using special curing agents. However, it would also be possible to use preimpregnated fibers or prepregs.

In this case, a plurality of fiber sections could be formed by a single semifinished fiber product, wherein the semifinished fiber product runs multiple times between the frame units by at least one change in direction on the frame. The semifinished fiber product is consequently guided back and forth between the two frame units and, in the process, is guided around fastening elements. The fibers of the semifinished fiber product could be continuous and, in particular, could be implemented as continuous fibers. As a particular preference, the entire net-like structure is produced by a single semifinished fiber product having continuous fibers. This results in an even better flow of force. The fastening elements could be embodied in the form of openings or hooks. Alternatively, the net-like structure could also be laminated or adhesively bonded onto the frame units.

In a preferred embodiment, at least 90% of a surface spanned by the shell surface arrangement is covered by the net-like structure. Accordingly, the net-like structure forms a large part of the shell surface arrangement. Only outer edges or reinforcing edges or the like could be provided in addition to the net-like structure. The greatest possible weight saving is thereby achieved.

It is preferred if at most 75% of a net surface spanned by the net-like structure is closed. As a result, 25% of the net surface spanned by the net-like structure forms gaps. As a preferred option, this proportion is increased still further to enable an even greater weight saving to be achieved. For example, the closed portion could be less than 75% and, in particular, less than 60%, and particularly preferably at most 50%.

The frame units are preferably each designed as an L-shaped frame component. This defines a general shape of the seat shell. In this case, the two legs of the L shape could delimit the seat surface and the backrest. As a preferred option, the frame components are manufactured integrally, with the result that the two legs, in particular, merge seamlessly into one another and the flow of force is optimized. It is furthermore conceivable for the spacing of the frame components in the region of the seat surface to be greater than on an upper side of the backrest.

In an advantageous embodiment, the frame units are formed from a second fiber-reinforced plastic. The second fiber-reinforced plastic could correspond to the first fiber-reinforced plastic. Depending on the desired embodiment of the net-like structure, however, the two plastics could also differ from one another. Since the frame components can be designed as largely continuous, gap-free components, different production methods from those in the case of the net-like structure could be considered. A vacuum infusion method may be suitable if, for example, a fiber-reinforced plastic based on a thermosetting resin is used. If the two fiber-reinforced plastics are identical, integral production of the entire seat shell would also be conceivable.

It is advantageous if the frame units each have an upper cutout and a lower cutout as holding elements, wherein the receiving elements have bodies which are rod-shaped, at least in some region or regions, and which are shaped so as to correspond to the holding elements. The frame units can then be placed on the rod-shaped bodies or connected thereto. The introduction of load from the seat shell into a base receiving the seat shell, i.e. a receiving surface, a stand or the like, can consequently take place in a manner similar to that in the case of conventional vehicle seats. The seat shell could then be connected to conventional stands for vehicle seats, for example. The rod-shaped bodies can be designed as tubular crossmembers. These could be formed from a metallic material, from a fiber-reinforced plastic, or from a mixture of these materials.

It might be expedient to configure the crossmembers to be movable in order to be able to adjust to different seat rail spacings. Furthermore, it would also be possible for legs of a stand to be arranged only on side cheeks or on the sides of the crossmembers.

In an advantageous embodiment, at least one receiving element is designed as an elongate, continuous body which, in order to receive a plurality of seat shells arranged side-by-side, is designed to extend through the holding elements thereof. In this way, it would be possible, for example, to equip a stand with a plurality of seats in order to obtain a seat group. In this context, two additional seat shells laterally adjoining a central seat shell could be accommodated, for example. A single stand could be used for this purpose.

Furthermore, the shell surface arrangement can form a seat surface and a backrest. Separate production of a seat surface and a backrest is then not necessary, and the fiber sections can extend into a region or regions of both surfaces.

The seat surface and the backrest could merge continuously into one another. This leads to a particularly weight-saving embodiment. In the context of an L-shaped configuration of the frame components, however, it is not possible to pivot the backrest.

A density of the net-like structure can be higher in the region of the seat surface than in the region of the backrest. This is likewise a preferred aspect of a configuration appropriate to the loads involved. In the region of the seat surface, higher loads over a smaller surface area are to be expected in comparison with the backrest. Consequently, the density of the net-like structure likewise follows the expected load distribution.

It is particularly advantageous if the vehicle seat also has a stand for arranging the vehicle seat on a floor, wherein the stand is coupled to the holding elements of the seat shell by the receiving elements. The vehicle seat is then constructed from two main components. These are coupled to one another to form the vehicle seat. In this case, a base of the vehicle seat is formed by the stand. The stand has an underside which is designed to be coupled to fastening elements on the floor of the vehicle in question. These could comprise, for example, seat rails which extend in the floor along the longitudinal direction of the cabin. The customary practice is to use pairs of spaced-apart seat rails which have a longitudinal grid with spaced-apart openings for locking a fitting that can be coupled to the stand. The stand can furthermore have an upper side which is designed to receive the seat shell. The stand could have two pairs of crossed seat legs made of a metallic material. Thus, the stand could be embodied in a manner similar to a conventional seat stand. Alternatively, a design with seat feet and seat legs with a diagonal strut would also be conceivable. The stand could be composed substantially of a metallic material, e.g. aluminum. As an alternative to this, a fiber-reinforced plastic would also be conceivable.

The first fiber-reinforced plastic and/or the second fiber-reinforced plastic could comprise carbon fibers embedded in a matrix consisting of or comprising a plastic. In this way, the lowest possible weight is achieved with high strength. Thus, the first fiber-reinforced plastic and the second fiber-reinforced plastic could also be identical. It is possible to provide both plastics with carbon fibers.

A further essential feature of the seat shell could also be the integration of components made of the same or different materials, such as, for example, an eye or a bush made of metal. In particular, mention should be made here of the fiber-appropriate design and form fit of the metal parts, by virtue of which optimized deposition of the fibers takes place, at wrapping points for instance, and a fiber-appropriate form fit takes place. Furthermore, an integral vehicle seat design or also a vehicle seat bench design in which a hybrid embodiment is involved could also be possible.

The disclosure herein furthermore relates to an aircraft, having at least one cabin with at least one vehicle seat as disclosed herein.

BRIEF DESCRIPTION OF THE DRAWINGS

Further features, advantages and possible applications of the disclosure herein will be found in the following description of the example embodiments and the figures. In this context, all the features described and/or illustrated graphically form the subject matter of the disclosure herein in themselves and in any desired combination, irrespective of their combination in the individual claims or the dependency references thereof. In the figures, the same reference signs are furthermore used for the same or similar objects.

DETAILED DESCRIPTION

Figure 1:
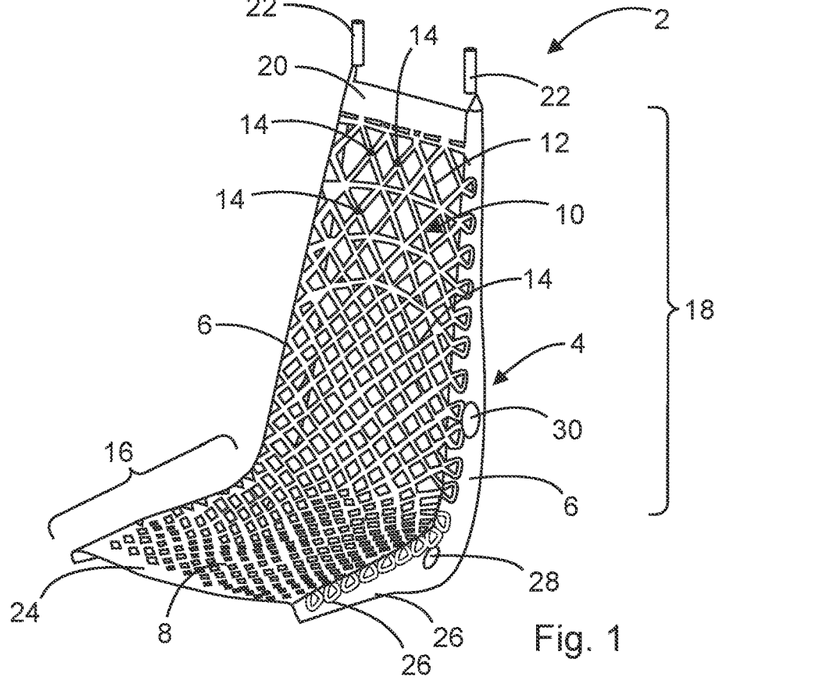
FIG. 1 shows a seat shell in a three-dimensional view.

FIG. 1 shows a seat shell 2 for a vehicle seat, which is shown in full, for example, in the following FIG. 6. The seat shell 2 has a frame 4 with 2 frame units 6 spaced apart from one another. These are configured as L-shaped frame components, for example. A shell surface arrangement 8 is spanned between the frame units 6 and has a net-like structure 10 comprising a multiplicity of linear or strip-shaped, intersecting fiber sections 12. The arrangement of the fiber sections 12 results in an arrangement of open meshes, delimited by the fiber sections 12, with nodes 14. A seat surface 16 and a backrest 18 are thereby formed. In this example, the seat surface 16 merges seamlessly into the backrest 18.

Arranged on an upper side of the backrest 18 is an upper transverse stiffening element 20, which extends horizontally from one of the frame components 6 to the other frame component 6. Furthermore, there are holders 22 there for receiving a head restraint (not shown in this illustration). A lower transverse stiffening element 24 is provided at a front boundary of the seat surface 16, which lower transverse stiffening element likewise extends horizontally from one of the frame components 6 to the other frame component 6.

The fiber sections 12 extend with a predetermined alternating orientation, forming a zigzag pattern, between the frame units 6. For this purpose, corresponding fastening elements 26, around which a fiber bundle can be laid, can be provided on the frame units 6. When a fiber bundle is laid around a fastening element 26, a change in direction takes place. The fibers are ideally laid in the direction of tension. Of course, the net-like structure 10 can also be produced separately, so that the fiber bundle is not placed around the fastening elements 26 but around corresponding holders of a molding tool. After the net-like structure has been removed from the molding tool, the tabs resulting from this can be connected to the frame units 6. In addition to the use of mechanical fastening elements, this can also be accomplished by lamination or adhesive bonding.

The fiber sections 12 are preferably designed as sections of a continuous-fiber bundle. The net-like structure 10 is then produced by following a winding plan which specifies the direction of extent and the changes in direction of the continuous fibers. In this case, according to the present example embodiment, it is also possible for individual fiber sections 12 to extend from the seat surface 16 into the backrest 18 and vice versa. This produces an ergonomically curved seat shell 2 which is configured in a manner appropriate to the loads.

By way of example, the frame components 6 have holding elements 28 and 30, which are designed as a lower cutout 28 and an upper cutout 30. In this case, in each case two holding elements 28 and 30 are located opposite one another, thus enabling a rod-shaped or tubular body to be pushed through them. The seat shell 2 can thereby be fastened on a seat stand (not illustrated here).

Figure 2:
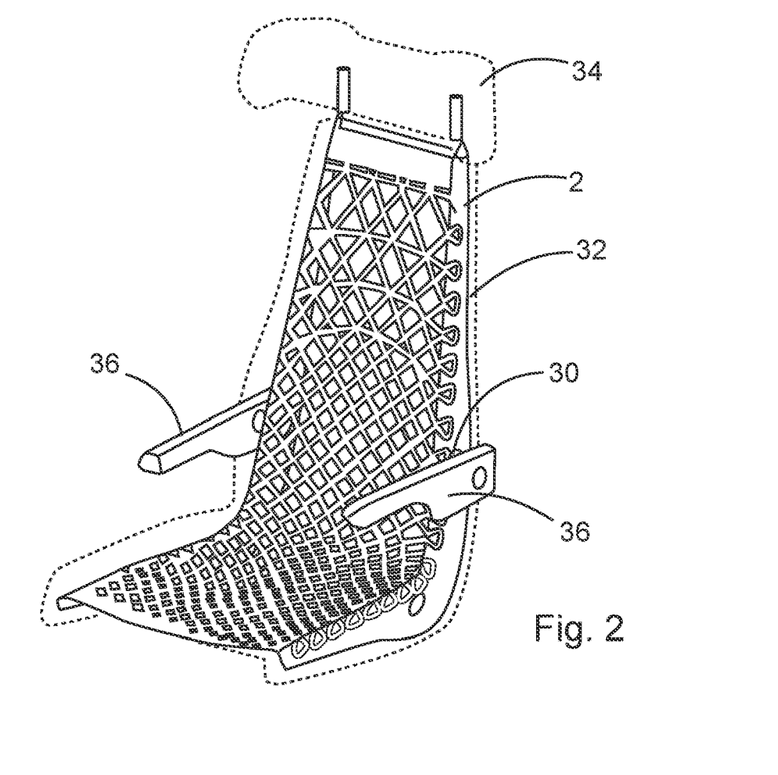
FIG. 2 shows the seat shell with upholstery.

FIG. 2 shows the seat shell 2, which is equipped with additional upholstery 32 and a head restraint 34. Armrests 36, which are arranged pivotably on the seat shell 2, adjoin the upper holding elements 30 laterally. The upholstery 32 can be produced from a flexible material, in particular by open-cell foam. However, the head restraint 34 could also have a core consisting of or comprising a closed-cell, rigid foam, which is surrounded by a flexible, open-cell foam.

Figure 3:
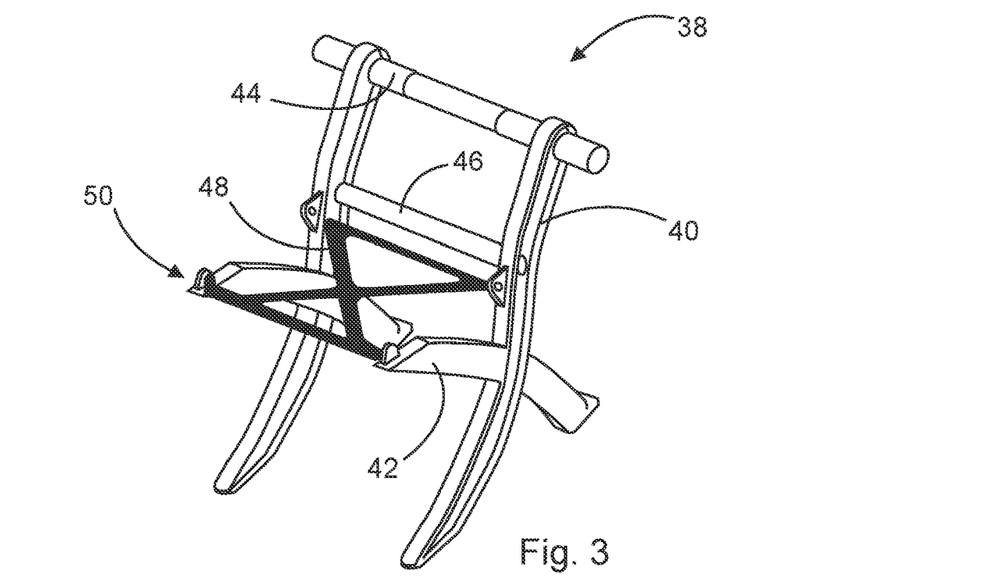
FIG. 3 shows a seat stand in a three-dimensional view.

FIG. 3 shows a seat stand 38, which has 2 crossed seat legs 40 and 42. The seat legs 40 carry an upper crossmember 44 as a receiving element, which can be coupled to the upper cutouts 30. Furthermore, a lower crossmember 46 is shown, which is provided to receive the lower cutouts 28. Both crossmembers 44 and 46 are held exclusively by a pair of the seat legs 40. From the lower crossmember 46, a support surface 48 extends to upper ends 50 of the other pair of seat legs 42. The supporting surface 48 can be produced from intersecting strip-like webs consisting of or comprising a fiber-reinforced plastic. Alternatively, straps could be used.

Figure 4:
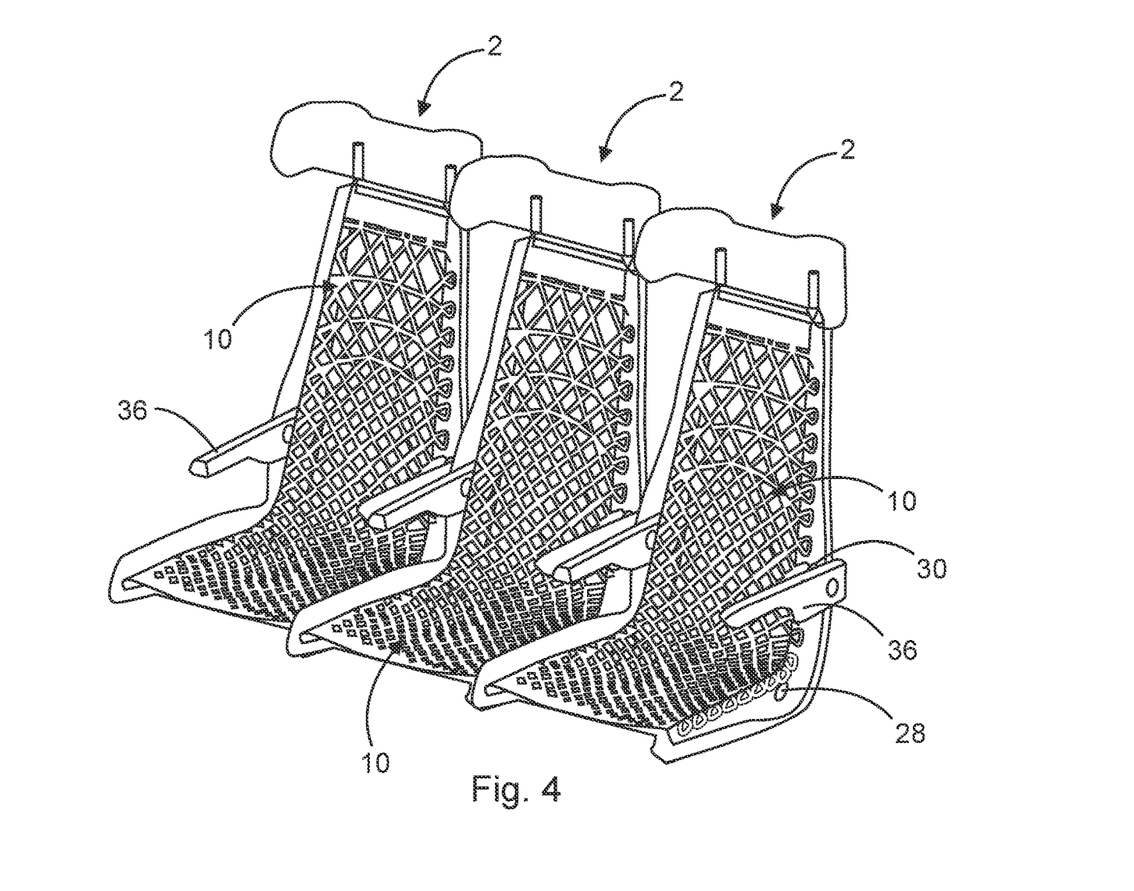
FIG. 4 shows multiple seat shells arranged side-by-side.

As shown in FIG. 4, multiple seat shells 2 may be arranged side-by-side to provide a single seat group. For this purpose, the seat shells 2 can be fastened to one another or can be connected to the seat stand 38 exclusively via laterally outwardly projecting crossmembers 44 and 46.

Figure 5:
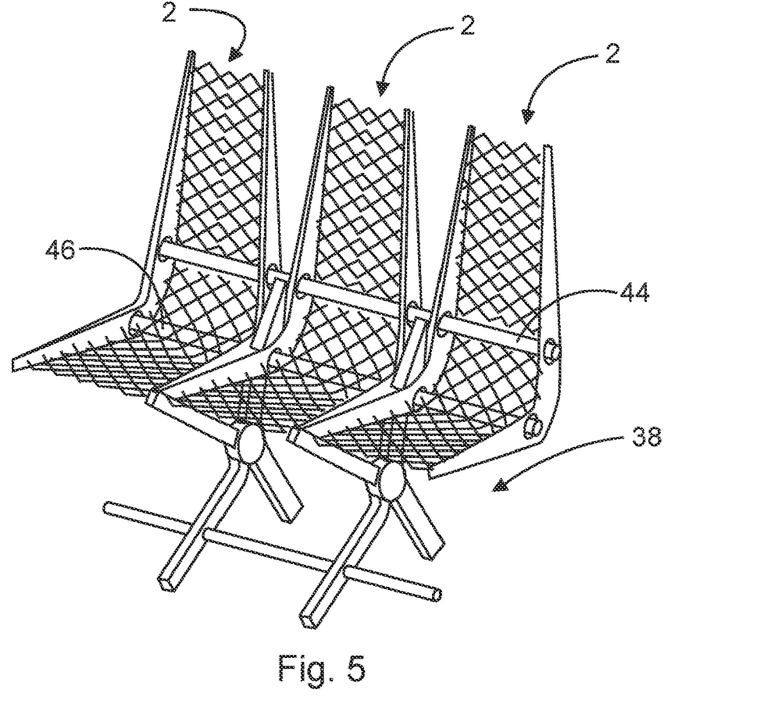
FIG. 5 shows a passenger seat group consisting of or comprising seat shells from FIG. 1 and the seat stand from FIG. 3.

FIG. 5 then shows multiple seat shells 2 with upholstery 32 and head restraints 34, which are mounted on a single seat stand 38 with lower and upper crossmembers 44 and 46. This provides a weight-saving seat group.

Figure 6:
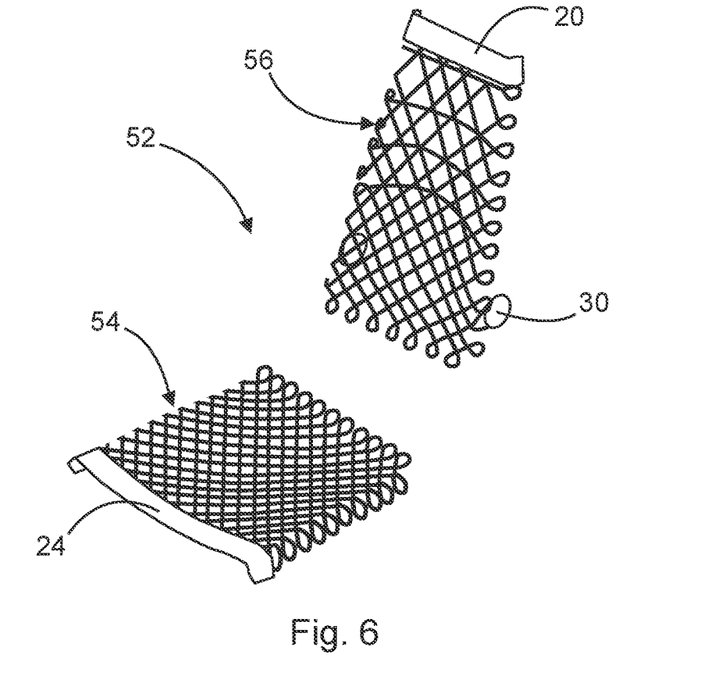
FIG. 6 shows a shell surface arrangement for vehicle seats with adjustable backrest.
Figure 7:
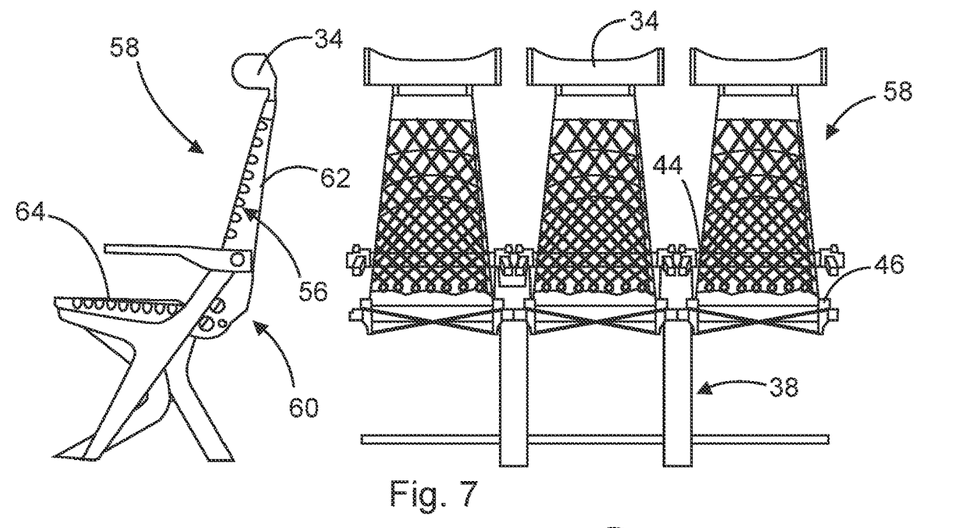
FIG. 7 shows a passenger seat group comprising seat shells with a shell surface arrangement from FIG. 6 and a stand from FIG. 3 in a two-sided view.

However, FIG. 6 shows a variant of a shell surface arrangement 52, which consists of or comprises two separately produced components in the form of a seat surface 54 and a backrest 56. These can be used to produce vehicle seats 58 which have an adjustable backrest 56. For this purpose, instead of the L-shaped frame units 6 from FIG. 1, two-part frame units 60 are used, which have an upper frame component 62 and a lower frame component 64. As illustrated, these too can be used by upper and lower crossmembers 44 and 46 on a seat stand 38.

Figure 8:
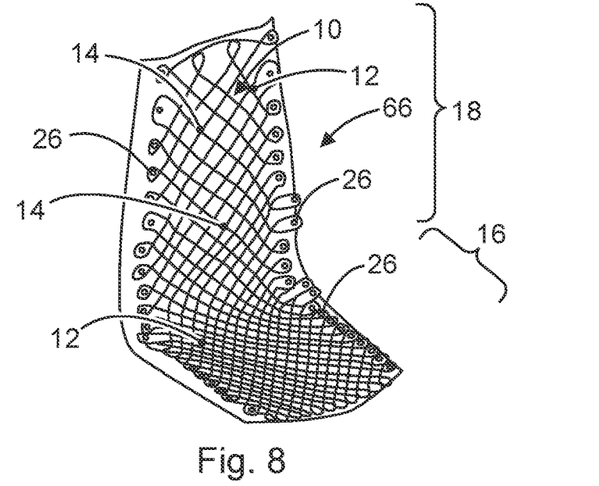
FIG. 8 shows a winding plan for fibers.

FIG. 8 shows an illustrative winding plan 66 for laying fibers for providing the fiber sections 12 for producing a seat shell 2. It can be seen particularly clearly here where individual fastening elements 26 must be arranged to enable the net-like structure 10 to be fastened. These can also comprise adhesive or a receiving section for laminating on the net-like structure. Moreover, it can be seen that a density of the net-like structure 10 is higher in the region of the seat surface 16 than in the region of a backrest 18.

Figure 9:
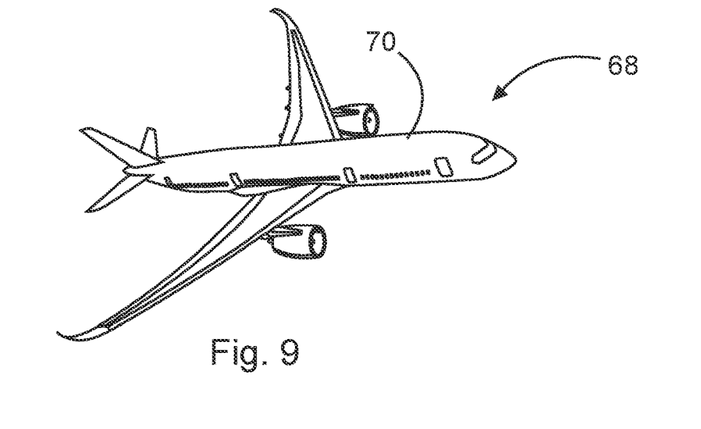
FIG. 9 shows an aircraft in which the vehicle seats can be arranged.

FIG. 9 shows, by way of example, an aircraft 68 as an example of a vehicle which may have a passenger cabin 70 with vehicle seats 2 or 58 arranged therein.

Figure 10A:
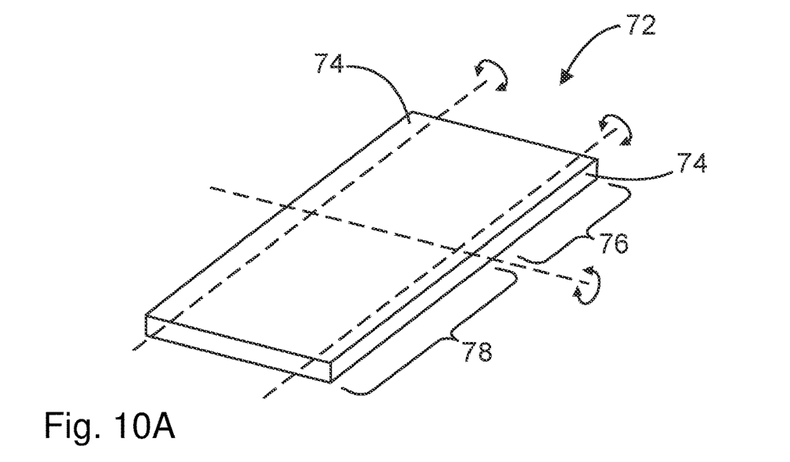
FIGS. 10A, 10B and 10C show a schematic illustration of a molding tool.
Figure 10B:
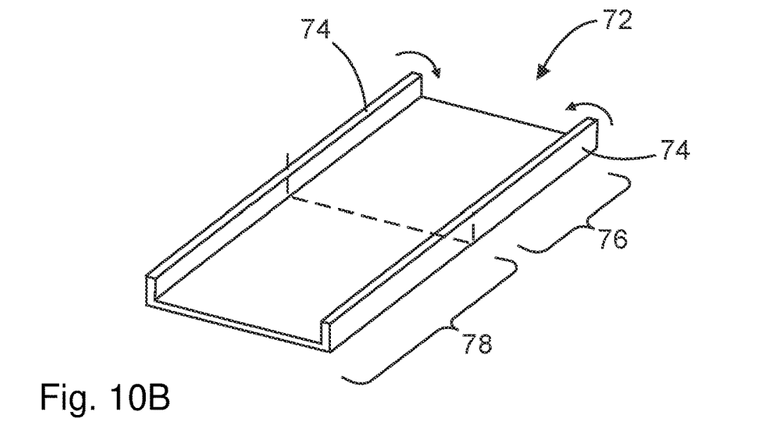
Figure 10C:
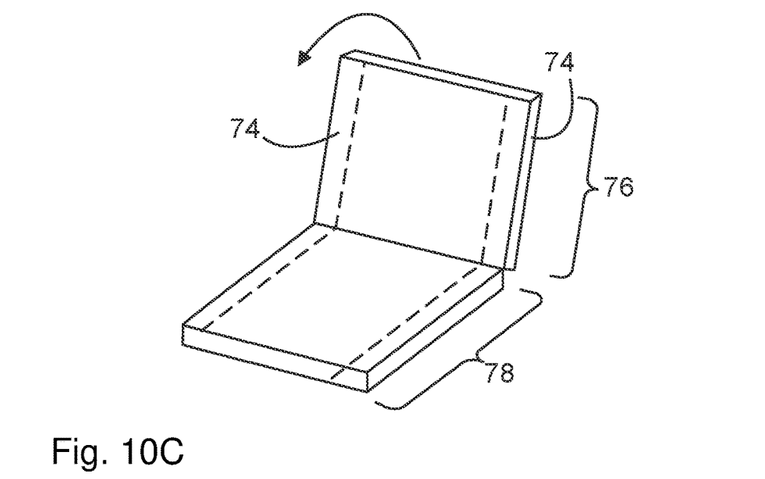

FIGS. 10A, 10B and 10C show very schematically a molding tool 72 which can be used to produce the net-like structure 10. The molding tool 72 is shown flat here, but it may have a multiply arched and/or curved shape in order to achieve the desired shape of the net-like structure 10.

As can be seen in the previous figures, the net-like structure 10 is bent over somewhat at its sides to enable it to be laid on the frame units 6 and fastened there. Furthermore, a significant bend is provided to form the seat surface 16 and the backrest 18. This could be achieved by the schematically illustrated molding tool 72. This has two hinged side parts 74, which are used to deform a noncrimp fabric arranged on the molding tool 72 in order to produce the bent-over sides of the net-like structure 10. At the same time, the molding tool 72 could be divided in the longitudinal direction into a first section 76 and a second section 78, which can be pivoted relative to one another to deform the noncrimp fabric in order to provide the bend between the seat surface 16 and the backrest 18. This illustration is incomplete for the sake of simplicity. In particular, folding over could be produced with a somewhat different mechanism in order to obtain larger bending radii. Furthermore, the noncrimp fabric located on the molding tool could be provided with a shape-elastic covering which serves to fix the noncrimp fabric. The molding tool 72 could also be heatable in order to soften a thermoplastic matrix material of the fiber sections 12 or in order to cure a thermosetting resin.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority. Reference signs in the claims should not be regarded as a restriction.

REFERENCE SIGNS 2 seat shell
4 frame
6 frame unit
8 shell surface arrangement
10 net-like structure
12 fiber sections
14 node
16 seat surface
18 backrest
20 upper transverse stiffening element
22 holder
24 lower transverse stiffening element
26 fastening element
28 lower cutout/holding element
30 upper cutout/holding element
32 upholstery
34 head restraint
36 armrest
38 seat stand
40 seat leg
42 seat leg
44 upper crossmember/receiving element
46 lower crossmember/receiving element
48 supporting surface
50 upper end
52 shell surface arrangement
54 seat surface
56 backrest
58 vehicle seat
60 frame unit
62 upper frame component
64 lower frame component
66 winding plan
68 aircraft
70 passenger cabin

The invention claimed is:

1. A vehicle seat comprising:
    at least one seat shell comprising:
        a frame with two frame units that are spaced apart from each other; and
        a shell surface arrangement extending between the two frame units, wherein the shell surface arrangement comprises a net-like structure comprising a first fiber-reinforced plastic;

wherein the seat shell comprises at least one holding element configured for connection to a corresponding receiving element for fastening the seat shell;

wherein the net-like structure has a multiplicity of linear or strip-shaped and intersecting fiber sections;

wherein the fiber sections are formed by a single semi-finished fiber product, the semi-finished fiber product running multiple times between the frame units due to at least one change in direction on the frame, and wherein the fiber sections of the entire net-like structure are produced by a single semi-finished fiber product having continuous fibers.

2. The vehicle seat of claim 1, wherein at least 90% of a surface spanned by the shell surface arrangement is covered by the net-like structure.

3. The vehicle seat of claim 1, wherein at most 75% of a net surface spanned by the net-like structure is closed.

4. The vehicle seat of claim 1, wherein the frame units are each configured as an L-shaped frame component.

5. The vehicle seat of claim 1, wherein the frame units are formed from a second fiber-reinforced plastic.

6. The vehicle seat of claim 1, wherein the shell surface arrangement forms a seat surface and a backrest.

7. The vehicle seat of claim 6, wherein the seat surface and the backrest merge continuously into one another.

8. The vehicle seat of claim 6, wherein a density of the net-like structure is higher in a region of the seat surface than in a region of the backrest.

9. The vehicle seat of claim 1, further having a stand for arranging the vehicle seat on a floor, wherein the stand is coupled to the holding elements of the seat shell.

10. The vehicle seat of claim 9:
wherein the frame units each have an upper cutout and a lower cutout as holding elements; and
wherein the receiving element has bodies which are rod-shaped, at least in a region or regions, and which are shaped to correspond to the holding elements.

11. The vehicle seat of claim 10, wherein at least one receiving element is an elongate, continuous body which, to receive a plurality of seat shells arranged side-by-side, is configured to extend through the holding elements thereof.

12. The vehicle seat of claim 1, wherein the first fiber-reinforced plastic and or the second fiber-reinforced plastic comprises carbon fibers embedded in a matrix comprising a plastic.

13. An aircraft having at least one cabin with at least one vehicle seat of claim 1 arranged therein.

* * * * *